Figure 1:
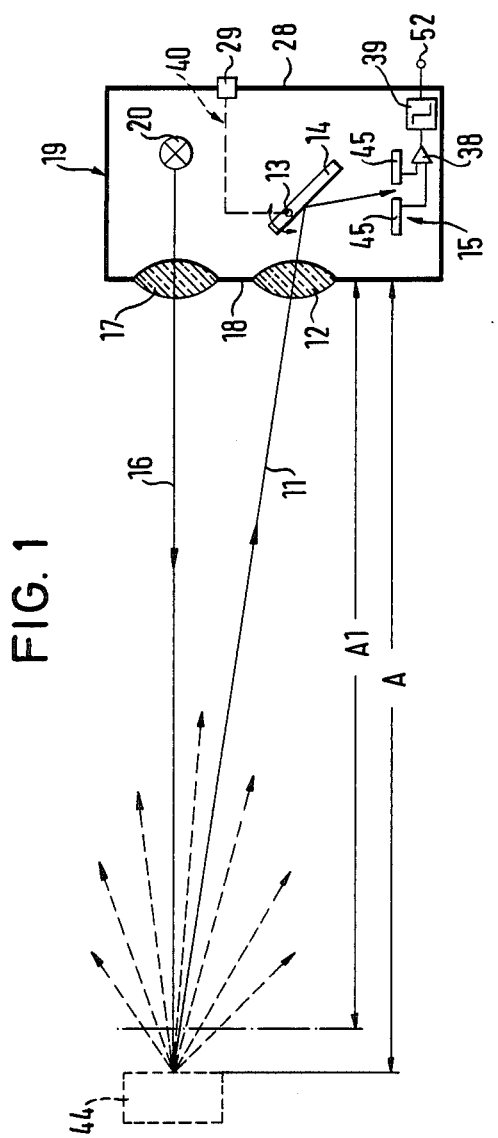

United States Patent [19]

Haas et al.

[11] Patent Number: 4,782,224

[45] Date of Patent: Nov. 1, 1988

[54] ELECTROOPTICAL PRESENCE RECOGNITION-SENSOR

[75] Inventors: Klaus D. Haas; Thomas Meinert, both of Emmendingen, Fed. Rep. of Germany

[73] Assignee: Erwin Sick GmbH Optik-Elektronik, Fed. Rep. of Germany

[21] Appl. No.: 841,822

[22] Filed: Mar. 20, 1986

[30] Foreign Application Priority Data

Apr. 16, 1985 [DE] Fed. Rep. of Germany ....... 3513671

[51] Int. Cl.[4] .............................................. G01V 9/04
[52] U.S. Cl. ..................................... 250/221; 340/556
[58] Field of Search ...................... 250/221, 201, 222.1; 356/239, 1, 4; 340/555, 556

[56] References Cited

U.S. PATENT DOCUMENTS

| | | | |
|---|---|---|---|
| 3,752,978 | 7/1973 | Kahl et al. | 340/556 |
| 3,999,192 | 12/1976 | Hosoe et al. | 250/201 AF |
| 4,123,650 | 10/1978 | Hosoe et al. | 250/201 AF |
| 4,162,124 | 7/1979 | Feldman et al. | |
| 4,291,223 | 9/1981 | Sakane et al. | 250/201 AF |
| 4,314,239 | 2/1982 | Odone et al. | 340/556 |

FOREIGN PATENT DOCUMENTS 0016969 10/1980 European Pat. Off. .
0061937 10/1982 European Pat. Off. .
2046551 11/1980 United Kingdom .

*Primary Examiner*—David C. Nelms
*Assistant Examiner*—Jessie Ruoff

[57] ABSTRACT

In a light sensor with a housing (19) the light transmitter (17, 20) and the light receiver (12, 15) are arranged alongside one another. The received light beam (11) is deflected behind the front receiving lens (12) onto a photoelectric converter arrangement (15) via a deflecting mirror (14) which is pivotable about a transverse axis (13) and it is possible to change the sensing distance by pivoting the deflecting mirror (14).

32 Claims, 3 Drawing Sheets

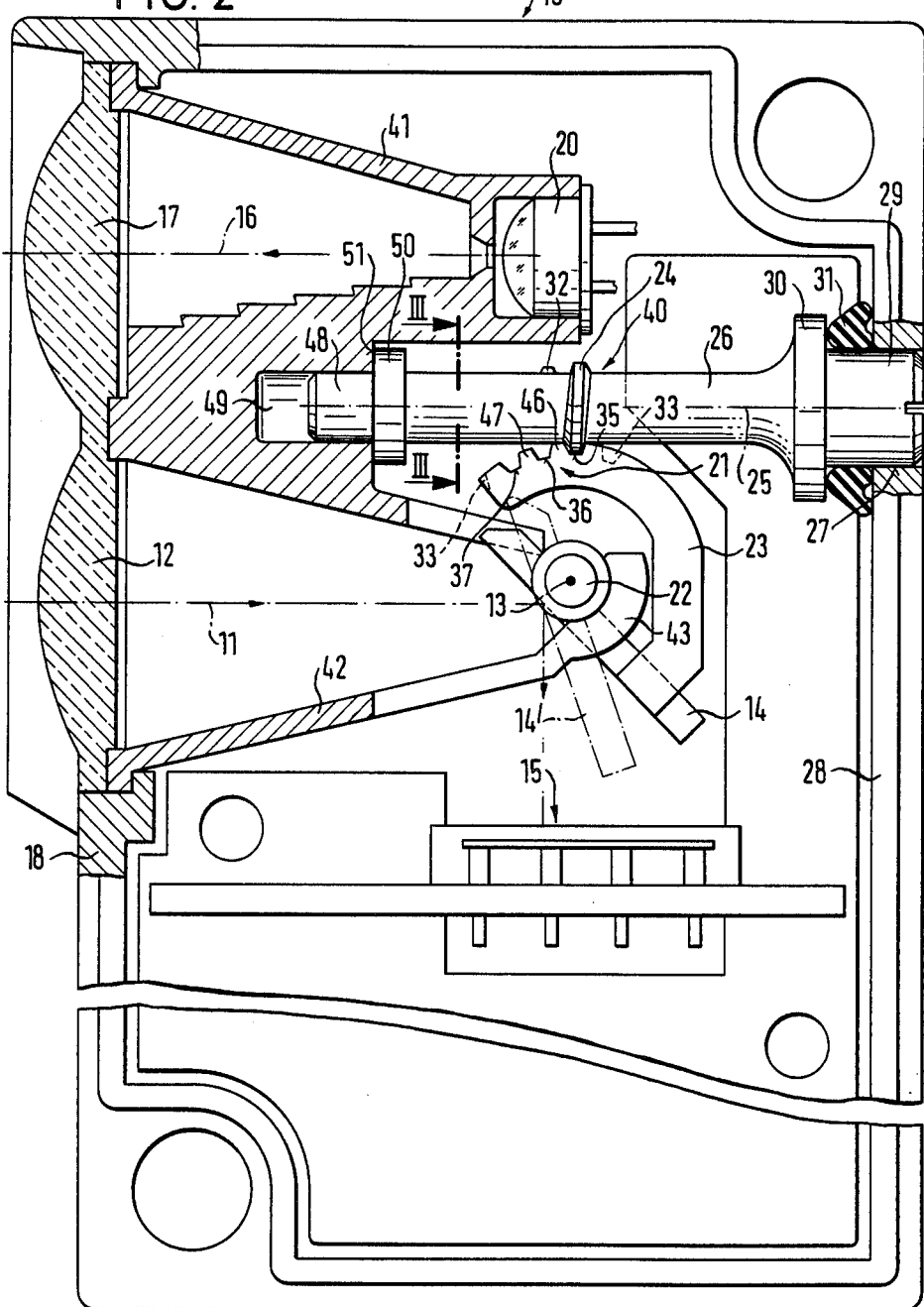
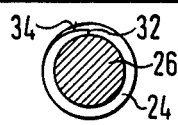
FIG. 2
FIG. 3

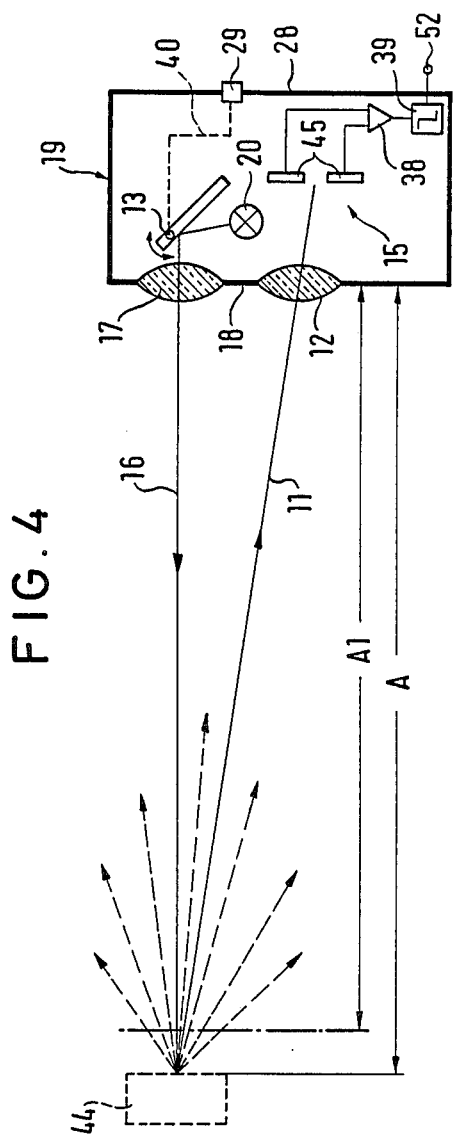

ELECTROOPTICAL PRESENCE RECOGNITION-SENSOR

The invention relates to a distance sensistive light sensor comprising a housing in which a light transmitter and a light receiver having a photoelectric converter arrangement are arranged adjacent to one another. The light transmitter and light receiver respectively transmit a bundled transmitted beam and receive a narrow received beam, which represents a narrow portion of a cone of scattered light reflected from an article on which the transmitted beam falls. The transmitted and received beams are arranged at a variable angle in such a way that they intersect at a desired distance from the housing, the distance being adjustable by variation of the angle.

Such light sensors serve for the recognition of light reflecting articles at a specific distance which may for example be guided past the light sensor. For this purpose it is however necessary that the transmitted and received light beams intersect at the location of the article to be recognised. In order to provide a light sensor with a defined adjustable sensing range it is already known from German Offenlegungsschriften Nos. 28 11 413, 30 04 691 and 29 24 685 to change the angle of the transmitted and/or received light beams in such a way that the point of intersection of the two beams lies a greater or lesser distance away from the housing, so that a desired scanning distance can be preselected within a predetermined range.

The disadvantage of known light sensors of this kind is the fact that the light source and/or the photoelectric converter arrangement have to be pivotably arranged in the housing which is disadvantageous, particularly because of the transmission of electrical power to these elements, quite apart from the adjustment problems.

A distance sensitive light sensor is already known (German Pat. No. 29 24 685) which contains a light transmitter and a light receiver with the respectively associated image forming optical systems in a housing. The optical axes of the optical systems for the light transmitter and for the light receiver intersect at a distance from the housing which can be adjusted to predetermine the sensing range. For this purpose the light transmitter and light receiver which are respectively combined with an optical system are each accommodated in a pivotal mount. The mounts are pivoted by means of a spindle drive so that the angle at which the axis of the optical systems intersect changes.

The known arrangement of the light transmitter, light receiver and the associated optical components on pivotable mounts is complicated and expensive from the point of view of the apparatus that is involved, is laborious to assemble and is not very stable during operation. The electrical lines must be laid out so that they leave the freedom required for the pivotal movement, so that special measures have to be taken for the wiring of the instrument and the lines (wiring) cannot be rigidly laid out.

The object underlying the invention is to provide a light sensor of the initially named kind in which all the photoelectric components, as many optical components as possible, and also the entire electronic arrangement can be fixedly and immovably disposed in the housing, but without having to renounce the defined adjustment of the specific sensing range at a desired distance from the housing.

In order to satisfy this object the invention provides either that the transmitted beam is deflected, before a front transmitter lens which is fixed in the housing, onto the front transmitter lens via a deflecting mirror which is pivotable about a transverse axis from the light source which is fixed in the housing to the side of the optical axis; or, preferably, that the received beam is deflected, after a front receiving lens which is fixed in the housing, via a deflecting mirror which is pivotable about a transverse axis onto the photoelectric converter arrangement which is fixed in the housing to the side of the optical axis.

The invention thus provides a pivotable deflecting mirror for adjusting the angle between the central beams passing through the light transmitting and light receiving optical systems while the transmitter, the light receiver and a front lens associated with the light transmitter and light receiver are fixedly disposed relative to the housing.

As a result of the construction of the invention it is only necessary for the deflecting mirror arranged at the receiving side or at the transmitting side in the housing to be movably arranged, whereas all the other electronic, optoelectronic and optical components are fixed and immovable, i.e. can be disposed precisely adjusted within the housing. The light sensor in accordance with the invention makes it possible at the same time to ideally adjust the sensing range up to a desired distance from the housing by suitably pivoting the deflecting mirror.

It is preferable for the transmitted beam to emerge from the housing perpendicular to the wall containing the front transmitting lens.

A very compact arrangement is obtained when the front receiving lens and the front transmitting lens are arranged directly above one another or alongside one another in a wall of the housing and are preferably pressed from a single transparent body.

An arrangement which is very compact in the direction of the optical axis is achieved in that the light source, which is preferably a luminescent diode, is arranged in the focal plane of the front transmitter lens.

Furthermore, the deflecting mirror is advantageously arranged between the front receiving lens and the focal plane of the same, and indeed preferably at a distance of $\frac{2}{3}$ of the focal lens of the front receiving lens.

It is also advantageous for the axis of rotation of the deflecting mirror to extend perpendicular to the plane defined by the received beam and the transmitted beam. In this manner the light source and the photoelectric converter arrangement can be arranged in a plane in the housing, and indeed in the same plane as the front lenses which leads to a very shallow construction for the housing.

In order to have adequate space between the light transmitter and the light receiver for the rotary actuation of the deflecting mirror the photoelectric converter arrangement is disposed, in accordance with a further advantageous embodiment, on the side of the deflecting mirror remote from the light source.

Relatively small pivotal ranges of for example 25° are sufficient to realise sensing ranges at very different distances from the housing. The pivotal range of the deflecting mirror is generally restricted to an angle between 20° and 30°. In this way the received light beam can be pivoted sufficiently far to correspond to all the cases which occur in practice.

An optically and constructionally preferred embodiment is so constructed that the received beam is deflected in the one end position of the deflecting mirror, which is preferably the shallowest end position, through an angle of approximately 90°.

In order to prevent the surface of the mirror wandering away from the desired position the surface of the deflecting mirror should lie close to its axis of rotation In order to achieve a sensitively adjusted deflecting mirror a particularly preferred embodiment of the invention provides that the deflecting mirror is adjustable via a worm gear drive. For this purpose the deflecting mirror is expediently mounted on a tooteed segment coaxial to the axis of rotation.

An advantageous constructional development of the invention is characterised in that the deflecting mirror is rotationally mounted in the housing via two lateral spigots.

In order to ensure a mounting of the deflecting mirror and of the mechanical parts which actuat it which is as free as possible from play and which operates without jerks or jolts a further advantageous embodiment of the invention provides that the toothed segment is connected with the deflecting mirror via a preferably resiliently biased hoop in such a way that the spigots are pressed by the worm against the mount.

A particularly compact arrangement is obtained if the toothed segment lies on the side of the axis of rotation which faces the light source. In this arrangement the worm should be arranged between the axis of rotation and the light source, with the worm's axis of rotation extending parallel to the optical axes of the front lenses. In this way the area present between the transmitter and receiver parts, which is not required for optical purposes, is advantageously exploited for the arrangement and rotational mounting of the worm shaft which preferably carries the worm.

In order to be able to effect a displacement or ideal adjustment of the sensing range in simple manner the worm shaft has, in accordance with a further advantageous development of the invention, an actuating knob which can be rotated through an opening in the rear wall of the housing.

While the abovementioned resilient hoop contributes to a certain degree of friction which is expedient for the fixing of the once selected adjustment the fixing of the selected adjustment of the deflecting mirror can be further promoted by clampingly arranging a ring seal between the peripheral flange of the worm shaft and the inner surface of the rear wall. It is particularly advantageous if the worm has between one and two turns and preferably rather more than 20% of one turn and if the end surfaces which project radially from the worm shaft cooperate with counter surfaces provided at the toothed region of the toothed segment to limit the angle of pivoting of the toothed segment. In this way the shortened worm is simultaneously used to restrict the pivotal range of the deflecting mirror.

In order to avoid damage at the end of the pivotal range on the transmission of turning moments to the worm shaft which are too large, the invention further provides that the turns of the worm have a sloped surface in two end regions radial to the end in such a way that on abutment of the associated end surface with the counter-surface, and on the application of a larger torque to the worm shaft which would give rise to danger of damage, the worm can snap in the region of the relevant end surface over the outer edge of the counter-surface whereupon the worm rotates without rotating the toothed segment until it falls into the first adjacent tooth gap. In order, on the one hand, to enable a sensitive adjustment of the deflecting mirror and on the other hand, to provide self-locking between the worm and the toothed segment the pitch angle of the worm should be selected to be as small as possible. It lies in particular between 4° and 6° is preferably 5°.

The pitch of the worm should in particular be such that one can make do with three adjacent tooth gaps for the toothed segment over the desired pivotal range.

The light sensor of the invention is preferably used to recognise articles which are located within a specific limiting distance or maximum distance from the housing of the light sensor. Articles which are spaced from the housing of the light sensor by more than this limiting distance or maximum distance should thus not be recognised, but instead only articles which lie closer to the housing of the light sensor.

In order to achieve this a further advantageous embodiment of the invention provides that the photoelectric converter arrangement is a differential photoconverter arrangement connected to a difference amplifier and is arranged relative to the deflecting mirror in such a way that when an article is arranged at the limiting distance or somewhat on the far side of the maximum distance the signal at the output of the differential amplifier is zero and that, when articles are arranged at larger distances the signal adopts a different sign than for articles arranged at a smaller distance.

For this arrangement the photoelectric converter arrangement should in particular consist of two photoconverters arranged in series adjacent the deflecting mirror.

In order not to obtain a presence signal at small signal fluctuations brought about for example by disturbances provision should furthermore be made for the processing circuit to have a response threshold, such that a presence signal is first transmitted when the signal which has the right sign and which appears at the output of the differential amplifier is significantly distinguished from zero, i.e. the real maximum distance is smaller than the limiting distance.

The presence of an article is thus deduced via the signal amplitude of the received signal or by the imaging geometry of the sensor. The first case occurs for example, when the article is very far from the apparatus and has a small degree of reflectivity so that the received quantity of light is too small to be recognised by the photoconverters. If the degree of reflectivity of the article is adequately large and if it is located at a sufficiently small distance from the sensor then it can be determined, as a result of the imaging geometry, whether the article lies within or outside of the sensing range. If the articles lies at a larger distance from the light sensor than the point of intersection of the transmitted beam and the received beam then it will preferably be imaged by the receiving lens on the photoconverter which lies closest to the front lens arrangement. If the article lies between the sensor and this point of intersection then it will preferably be imaged by the receiving lens onto the photoconverter which lies furthest away from the front lens arrangement. By forming the difference of the two photocurrents one obtains an output signal the sign of which provides information on whether the article is located within or outside of the selected sensing range.

The invention will now be described in the following in more detail with reference to the drawings which show:

FIG. 1 a schematic sideview of a light sensor in accordance with the invention showing the associated beam path, FIG. 2 a partly sectioned sideview of a constructional realisation of the light sensor of the invention, and FIG. 3 a section on the line III—III of FIG. 2, and FIG. 4 a schematic sideview of a light sensor similar to FIG. 1 but showing a second embodiment.

As seen in FIG. 1 a front receiving lens 12 and a front transmitting lens 17 are arranged at a small distance above one another in the front wall 18 of a housing 19 which has the shape of a parallelopiped and which is shallow perpendicular to the plane of the drawing of FIG. 1. A luminescent diode 20 is located as a light source at the focal point of the front transmitting lens 17 so that a sharply bundled transmitted beam 16 emerges from the front transmitting lens 17 perpendicular to the front wall 18 of the housing 19. A light reflecting article 44 is assumed to be arranged at a limiting distance A from the front wall 18 of the housing 19 which reflects the incident light of the transmitted beam 16 in the sense of the arrows shown in broken lines within a scattering cone dependent on the material. A narrow section of this scattered cone, and indeed the received light beam 11 will be picked up by the front receiving lens 12 and reflected to a photoelectric converter arrangement 15 via a deflecting mirror 14 arranged behind the front receiving lens 12. The photoelectric converter arrangement 15 is disposed in the lower region of the housing and consists, as seen in FIG. 1, of two photoconverters 45 which are arranged directly behind one another and which are connected, in accordance with the invention, to a differential amplifier 38, so that a signal exists at the output of the differential amplifier 38 corresponding to the difference of the light fluxes falling on the two photoconverters 45.

If an article 44 is located in accordance with FIG. 1 at the limiting distance A from the housing 19, i.e. at the distance beyond which the article 44 can no longer be detected by the light sensor then the received light beam 11 falls directly in the middle between the spaced apart photoconverters 45. In this center position shown in FIG. 1 the signal zero arises at the output of the differential amplifier 38. The same signal would also occur at the output of the differential amplifier 38 if no article were present.

In order to now distinguish between the states "article within the sensing range" and "article outside of the sensing range" the output signal of the differential amplifier 38 is applied to a processing circuit 39 in which it is evaluated with regard to its amplitude and sign. If the signal is positive for example and if it reaches a response threshold provided in the evaluating circuit 39 then this signifies "article in the sensing range". If, in contrast, the signal is negative then this means "article outside of the sensing range".

If, in accordance with a preferred embodiment, a response threshold is provided inside the evaluating circuit 39, then the article 44 would not lead to a presence signal at the output 55 of the evaluation circuit 39 for any desired small displacement in the direction towards the housing 19, but rather only when the article 44 is located at a significantly smaller spacing A1 from the housing 19.

In accordance with the invention the deflecting mirror 14 is pivotable in the sense of the double arrow about the axis of rotation 13 which stands perpendicular to the plane of the drawing of FIG. 1. The pivotal movement can take place by rotating an actuating knob 29 which is accessible from the rear wall 28 and which is connected with the pivotable deflecting mirror 14 via a suitable transmission 40.

Depending on the distance A at which an article 44 is to be indicated the deflecting mirror 14 is adjusted to a different angle so that the point of intersection of the received beam 11 with the transmitted beam 16 is located at the position of the article 44. In this way it can be ensured that the received light beam 11 falls at the desired central position of the photoelectric converter arrangement 15 for each desired sensing range.

In FIGS. 2 and 3 the same reference numerals are used to designate parts which have counter-parts in FIG. 1.

As seen in FIG. 2 the photodiode 20 which represents the light source is mounted in a conically outwardly diverging optical cone 41, with the front transmitting lens 17 being located in the region of the largest cross-section of the optical cone 41. The space between the photodiode 20 and the front transmitting lens 17 is hermetically sealed so that no contamination can arise here. The photodiode 20 is arranged fixedly adjusted relative to the front transmitting lens 17 and relative to the housing 19.

Behind the front receiving lens 12 there is located a corresponding optical cone 42, which is however open at its rear end in such a way that the deflecting mirror 14 can be disposed there with the required pivotal range. The deflecting mirror 14 has spigots 22 at both sides by means of which it is rotatably mounted in a fixed mount 43 of the housing. A hoop 23 is secured in the lower region of the deflecting mirror 14 and extends in an approximately circular track upwardly around the rotational axis 13 to a position clearly above the axis of rotation 13 where it merges into a toothed segment 21 which has three radially outwardly disposed tooth gaps 35, 36, 37. Two teeth 46, 47 are located between the tooth gaps whereas in the peripheral direction outside of the tooth gaps 35, 37 the solid material of the toothed segment 21 extends somewhat further with a radial dimension which corresponds to the teeth 46, 47 by an amount which is greater than the width of the teeth 46, 47.

A worm 24 engages from above in the tooth gaps 35, 36, 37 of the toothed segment 21 and is formed on a worm shaft 26 rotatable about a longitidunal axis 25. In accordance with the invention the worm 24 is so short that it only extends by rather more than one turn about the worm shaft 26. At its two ends there are provided end surfaces 32 which serve as abutments (see also FIG. 3).

At its rear end the worm shaft 26 has the actuating knob 29 with a transverse slot which extends through an opening 27 in the rear wall 28 of the housing 19 so that it can be reached from the outside, for example by means of a screwdriver.

The worm shaft 26 has a peripheral flange 30 at a small distance from the rear wall 28 and a ring seal 31 is clampingly arranged between the peripheral flange 30 and the rear wall 28.

As seen in FIG. 3 the worm 24 is flattened somewhat in the direction of the end surfaces 32.

The front end of the worm shaft 26 is rotatably journalled by means of a rotary spigot 48 in a longitudinal bore 49 which is provided in the material of the housing between the transmitter and receiver parts. A peripheral flange 50 in the front region of the worm shaft 26 which abuts against an annular step 51 of the housing 19 ensures a troublefree axial fixing of the worm shaft 26, which is important for retaining the once selected pivotal position of the deflecting mirror 14 in a troublefree manner. The ring seal 31 is made sufficiently resilient that it resiliently presses the peripheral flange 50 in the longitudinal direction against the ring step 51.

The friction which hereby arises is also of importance because this prevents the rotary position of the worm shaft 26 being changed in undesirable manner, for example by vibrations, once it has been selected.

The relative arrangement of the worm shaft 26 of the toothed segment 21 and of the spigots 22 and the mount 23 is such that the worm 24 exerts a small force downwardly in FIG. 2 on the hub 23 so that the spigots 22 are pressed downwardly into the mount 43. In order not to generate bias forces which are too large in this way the hoop 23 is, in accordance with the invention, made somewhat resilient so that a precisely defined resilient contact pressure is present between the components which are connected to one another. In this way freedom from play is ensured on the one hand while on the other hand an elevated level of friction is generated between the mutual displaceable components which prevents an automatic undesired adjustment of the rotary position once it has been selected.

The manner of operation of the light sensor described above is as follows:

In order to set the sensing range at the desired limiting distance A from the housing 19 a test article is brought to the position of the article 44 whereupon the actuating knob 29 of the worm shaft 26 is turned in the one or other direction of rotation until the central position of the received beam 11 as shown in FIG. 1 is achieved and the signal zero is present at the output of the differential amplifier 38 of the evaluating circuit 39. The deflecting mirror 14 is then rotated by means of the actuating knob 29 in a direction such that the rear one of the two photoconverters 45 receives more light until a presence signal just appears at the output 52 of the evaluating circuit 39, i.e. until the response threshold has just been exceeded. This position, for example 14', remains after the relevant adjustment as a result of the frictional forces provided in accordance with the invention between the various rotatable elements.

The end of the pivotal range of the toothed segment 21 is determined when one of the end surface 32 abuts the corresponding counter-surface 33 of the toothed segment 21. In order to prevent damage to the toothed segment 21 in this case, on further forced rotation of the actuating head 29, the inclined region or chamfer 34 is so constructed in the region of the end surfaces 32 that when a turning moment which is too great is exerted on the actuating knob 29 the worm 34 snaps over the edge of the toothed segment 21, while the worm shaft 26 and/or the hoop 23 resiliently deflect, whereupon the worm 24 now slides on the edge of the toothed segment without causing rotation of it, until it finally once again snaps into the first tooth gap 35 or 37 from which it was resiliently lifted out as the ramp or chamfer 34 run up onto the edge of the toothed segment 21. Thus a torque limitation is achieved in simple manner which avoids any damage to the sensitive components.

We claim:

1. Electrooptical presence recognition sensor for detecting the presence of an article within a predeterminable sensing range having a near end adjacent said sensor and a far end remote from said sensor, said sensor comprising a housing having an optical axis; a light transmitter disposed in said housing in a fixed position for generating a beam of light; transmitting lens means disposed at said housing for directing said beam of light as a bundled transmitted beam out of said housing along said optical axis and over said sensing range to said far end thereof; receiving lens means disposed at said housing spaced apart said transmitting lens means for receiving a narrow beam of light inclined at an angle to said optical axis and being a narrow portion of a cone of scattered light generated by incidence of said transmitted beam on an article present in said sensing range, said angle having a minimum value at said far end of said sensing range; a photoreceiver arrangement disposed in said housing for detecting light from said received beam directed into said housing by said receiving lens means; and electronic circuit for processing signals generated by said photoreceiver arrangement in response to light received thereby; means for fixing said photoreceiving arrangement in said housing in a fixed position irrespective of the selected range; a deflecting mirror disposed in said housing in one of two location, namely a first location between said light transmitter and said transmitting lens means and a second location between said receiving lens means and said photoreceiver arrangement; menas defining a pivot axis for said deflecting mirror and operator controlled means for rotating said deflecting mirror about said pivot axis on installation of said sensor to predetermine said minimum value of said angle at which articles are detected and thus the position of said far end of said adjustable sensing range.

2. A sensor in accordance with claim 1, characterised in that said transmitted beam (16) is of fixed direction relative to said housing.

3. A sensor in accordance with claim 2, characterised in that said transmitted beam (16) emerges from said housing (19) perpendicular to a wall (18) containing the transmitter lens means (17).

4. A sensor in accordance with claim 1, characterised in that the receiving lens means and the transmitting lens means are arranged directly above one another or alongside one another in a wall (18) of the housing (19) and are preferably pressed from a single transparent body.

5. A sensor in accordance with claim 1, characterised in that the light transmitter (20), which is preferably a luminescent diode, is arranged in the focal plane of the transmitter lens means (17).

6. A sensor in accordance with claim 1, characterised in that the photoreceiver arrangement (15) is arranged in the focal plane of the receiving lens means (12).

7. A sensor in accordance with claim 1, characterised in that the deflecting mirror (14) is arranged between the receiving lens (12) and the focal plane of the same, and indeed preferably at a distance of ⅔ of the focal length of the receiving lens means (12).

8. A sensor in accordance with claim 1, characterised in that the pivot axis (13) of the deflecting mirror (14) extends perpendicular to the plane (FIG. 1) defined by the received beam and the transmitted beam (11, 16).

9. A sensor in accordance with claim 1, characterised in that the photoreceiver arrangement (15) is arranged on the side of the deflecting mirror (14) remote from the light transmitter (20).

10. A sensor in accordance with claim 1, characterised in that the deflecting mirror has a restricted pivotal range.

11. A light sensor in accordance with claim 10, characterised in that the pivotal range is restricted to an angle of 20° to 30° and in particular to an angle of approximately 25°.

12. A sensor in accordance with claim 8, characterised in that the received beam (11) is deflected in the one end position of the deflecting mirror (14), which is preferably the shallowest end position, through an angle of approximately 90°.

13. A sensor in accordance with claim 1, characterised in that the surface of the deflecting mirror (14) lies close to its pivot axis (13).

14. A sensor in accordance with claim 1, characterised in that the deflecting mirror (14) is adjustable via a worm gear drive (23, 24).

15. A sensor in accordance with claim 14, characterised in that the deflecting mirror (14) is mounted on a toothed segment (21) coaxial to the pivot axis (13).

16. A sensor in accordance with claim 15, characterised in that the deflecting mirror (14) is rotatably mounted in the housing (19) via two lateral spigots (22).

17. A sensor in accordance with claim 16, characterised in that the toothed segment (21) is connected with the deflecting mirror (14) via a preferably resiliently biased hoop (23) in such a way that the spigots (22) are pressed by the worm (24) against the mount (43).

18. A sensor in accordance with claim 15, characterised in that the toothed segment (21) lies on the side of the pivot axis (13) which faces the light transmitter (20).

19. A sensor in accordance with claim 18, characterized in that the worm (24) is arrangd between the pivot axis (13) and the light transmitter (20), with the worm's axis of rotation extending parallel to the optical axes of the transmitting and receiving lens means (12,17).

20. A sensor in accordance with claim 19, characterised in that the worm (24) is arranged on a worm shaft (26) which is rotatably journalled in the housing (19).

21. A sensor in accordance with claim 20, characterised in that the worm shaft (26) has an actuating knob (29) which can be rotated through an opening (27) in a rear wall (28) of the housing (19).

22. A sensor in accordance with claim 21, characterised in that a ring seal (31) is clampingly arranged between a peripheral flange (30) of the worm shaft (26) and the inner surface of the rear wall (28).

23. A sensor in accordance with claim 20, characterised in that the worm (24) has between one and two turns and preferably rather more than 20% of one turn; and in that the end surfaces (32) which project radially from the worm shaft (26) cooperate with counter-surfaces (33) provided at the toothed region of the toothed segment (21) to limit the angle of pivoting of the toothed segment (21).

24. A sensor in accordance with claim 23, characterised in that the turns of the worm (24) have a sloped surface (34) in two end regions radial to the end in such a way that on abutment of the associated end surface (32) with the counter-surface (33), and on the application of a larger torque to the worm shaft (26) which would give rise to danger of damage, the worm (24) can snap in the region of the relevant end surface (32) over the outer edge of the counter-surface (33) whereupon the worm (24) rotates without rotating the toothed segment (21) until it falls into the first adjacent tooth gap (35 or 37).

25. A sensor in accordance with claim 14, characterised in that the pitch angle of the worm (24) lies between 4° and 6° and is preferably 5°.

26. A sensor in accordance with claims 15, characterised in that the toothed segment (21) has three adjacent toothed gaps (35, 36, 37).

27. A sensor in accordance with claim 1, characterised in that the photoreceiver arrangement is a differential photoconverter arrangement (15) connected to a difference amplifier (38) and is arranged relative to the deflecting mirror (14) in such a way that when an article (44) is arranged at a limiting distance (A) or somewhat on the far side of a maximum distance (A1) the signal at the output of the differential amplifier (38) is zero and that, when articles (44) are arranged at larger distances the signal adopts a different sign than for articles arranged at a smaller distance.

28. A sensor in accordance with claim 27, characterised in that the photoelectric converter arrangement consists of two photoconverters (45) arranged in series adjacent the deflcting mirror (14).

29. A sensor in accordance with claim 27, characterised in that the difference amplifier (38) is connected to a processing circuit (39) which only transmits a presence signal with a signal with that sign which occurs when an article is present at a smaller distance than the limiting distance (A).

30. A sensor in accordance with claim 29, characterised in that the processing circuit (39) has a response threshold such that a presence signal is first transmitted when the signal which has the right sign and which appears at the output of the differential amplifier (38) is significantly distinguished from zero, i.e. the real maximum distance (A1) is lower than the limiting distance (A).

31. A sensor in accordance with claim 1, characterised in that the photoreceiver is disposed beneath the deflecting mirror.

32. Electrooptical presence recognition sensor for detecting the presence of an article within a predeterminable sensing range having a near end adjacent said sensor and a far end remote from said sensor, said sensor comprising a housing having an optical axis; a light transmitter disposed in said housing in a fixed position for generating a beam of light; transmitting lens means disposed at said housing for directing said beam of light as a bundled transmitted beam out of said housing along said optical axis and over said sensing range to said far end thereof; receiving lens means disposed at said housing spaced apart from said transmitting lens means for receiving a narrow beam of light inclined at an angle to said optical axis and being a narrow portion of a cone of scattered light generated by incidence of said transmitted beam on an article present in said sensing range, said angle having a minimum value at said far end of said sensing range; a photoreceiver arrangement disposed in said housing for detecting light from said received beam directed into said housing by said receiving lens means; an electronic circuit for processing signals generated by said photoreceiver arrangement in response to light received thereby; means for fixing said photoreceiving arrangement in said housing in a fixed position irrespective of the selected sensing range; a deflecting mirror disposed in said housing in one of two locations, namely a first location between said light transmitter and said transmitting lens means and a second location between said receiving lens means and said photoreceiver arrangement; means defining a pivot axis for said deflecting mirror and operator controlled means for rotating said deflecting mirror about said pivot axis on installation of said sensor to predetermine said minimum value of said angle at which articles are detected and thus the position of said far end of said adjustable sensing range, said operator controlled means comprising a worm gear drive, a toothed segment coaxial to the axis of rotation of said deflecting mirror upon which said mirror is mounted, a worm shaft rotatably journalled in the housing, the worm being arranged on said worm shaft, and an actuating knob on said worm shaft which can be rotated through an opening in a rear wall of the housing, said worm having between one and two turns and preferably rather more than 20% of one turn, and there are end surfaces projecting radially from the worm shaft which cooperate with counter-surfaces provided at the toothed region of the toothed segment to limit the angle of pivoting of the toothed segment, said turns of the worm having a sloped surface in two end regions radial to the end in such a way that on abutment of the associated end surface with the counter-surface, and on the application of a larger torque to the worm shaft which would give rise to danger of damage, the worm can snap in the region of the relevant end surface over the outer edge of the counter-surface, whereupon the worm will rotate without rotating the toothed segment until it falls into the first adjacent tooth gap.

* * * * *